United States Patent [19]
Abe et al.

[11] 3,887,683
[45] June 3, 1975

[54] METHOD FOR REMOVING NITROGEN OXIDES FROM WASTE GASES

[75] Inventors: Yasuhiko Abe; Hisayoshi Yamaguchi, both of Annaka, Japan

[73] Assignee: Shin-Etsu Handotai Co., Ltd., Japan

[22] Filed: Aug. 23, 1973

[21] Appl. No.: 391,021

[30] Foreign Application Priority Data
Aug. 23, 1972  Japan.................................. 47-84325
Sept. 6, 1972   Japan.................................. 47-89283

[52] U.S. Cl.................................. 423/235; 423/239
[51] Int. Cl............................................. B01d 53/34
[58] Field of Search ........ 423/213.2, 235, 239, 351; 252/447

[56] References Cited
UNITED STATES PATENTS

| | | |
|---|---|---|
| 3,032,387 | 5/1962 | Andersen et al..................... 423/235 |
| 3,034,853 | 5/1962 | Schmidt et al....................... 423/235 |
| 3,279,884 | 10/1966 | Nonnenmacher et al. .......... 423/239 |
| 3,576,596 | 4/1971 | Kranc et al. ..................... 423/239 X |
| 3,795,730 | 3/1974 | Kalvinskas........................... 423/239 |

*Primary Examiner*—G. O. Peters
*Attorney, Agent, or Firm*—Toren, McGeady and Stanger

[57] ABSTRACT

Nitrogen oxides contained in waste gases are removed by adding ammonia to the waste gases and passing the resulting mixture through a tower having a contact mass consisting of activated charcoal or vanadium oxides supported on activated charcoal at a space velocity of 1,000 to 50,000 parts by volume of gaseous mixture per hour per part by volume of catalyst at a temperature between room temperature and 150°C. High removal efficiency of nitrogen oxides (higher than 98 percent can be achieved.

5 Claims, 1 Drawing Figure

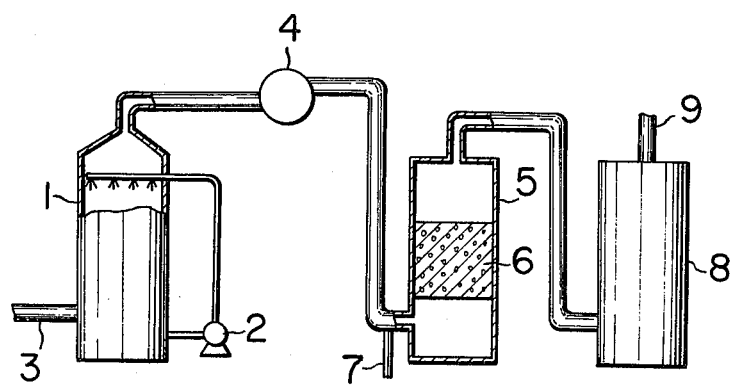

METHOD FOR REMOVING NITROGEN OXIDES FROM WASTE GASES

FIELD OF THE INVENTION

This invention relates to a method for removing nitrogen oxides at high efficiency from nitrogen oxide-containing waste gases.

BACKGROUND OF THE INVENTION

Exhaust gases from internal combustion engines, such as automobile engines, or tail gases from various chemical plants contain nitrogen oxides. These gases are harmful and cause serious problems of air pollution.

Recently, various methods have been proposed for the removal of harmful substances from waste gases, for example, the so-called wet process whereby nitrogen oxide-containing waste gases is scrubbed with water, an alkaline solution or the like, the so-called dry process whereby an adsorbent, such as, solid alkali, silica gel or activated charcoal, is employed, and a catalytic reduction method. All the methods have a disadvantage in that the removal effieceney of nitrogen oxides is low. Moreover, in the dry process, the regeneration of the adsorbent is troublesome and costly. The catalyticalic reduction method has a drawback in that the waste gas must, sometimes, be heated to a temperature suitable to effect the reduction. Another known method for removing nitrogen oxides from waste gases is based on the reaction of the nitrogen oxide and ammonia. This method is comparatively simple and the running cost is low, and therefore it is considered to be a relatively excellent method. However, the removal efficiency of nitrogen oxides in an industrial scale is of the order of 70–80 percent at the most.

OBJECTS OF THE INVENTION

It is the principal object of the present invention to provide a method wherein nitrogen oxides are removed from waste gases at a low temperature with high efficiency.

Another object of the invention is to provide a catalyst or a catalytic composition for promoting reactions between nitrogen oxides and ammonia.

SUMMARY OF THE INVENTION

The above-given objects of the invention can be accomplished by adding ammonia to the nitrogen oxide containing waste gases in an amount of 20 percent more than the amount stoichiometrically needed and passing the resulting gaseous mixture through a tower having a contact mass consisting of a catalytic composition selected from the group consisting of activated charcoal and vanadium oxides supported on activated charcoal at a temperature between room temperature and 150°C at a space velocity of from 1,000 to 50,000 parts by volume of gaseous mixture per hour per part by volume of catalyst. According to this method, the removal efficiency of nitrogen oxides can become as high as 98 percent.

DETAILED DESCRIPTION OF THE INVENTION

Most of the nitrogen oxides contained in waste gases from chemical plants, various internal combustion engines or from metal surface treating works are nitrogen monoxides (NO) and nitrogen dioxide ($NO_2$). These nitrogen oxides react with ammonia according to the following reactions:

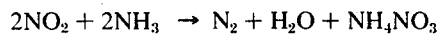

to produce harmless nitrogen gases, water vapors and white fumes of ammonium nitrate or nitrite. However, it has been thought difficult to complete these reactions successfully. The fumes of ammonium salts thus produced are in the form of finely divided particles, each particle, having a diameter of from about 0.1 to about 1$\mu$, and it is difficult to collect the particles only by scrubbing with water or by means of a conventional cyclone.

According to the method of this invention, not only the above-mentioned reactions between the nitrogen oxides and ammonia are accelerated, but also the coagulation of the finely divided particles of ammonium salts with each other is accelerated. The resulting particles have a relatively large size of from about 1 to about 10$\mu$ and, advantageously, can be collected easily.

In the practice of the method of the invention, the ammonia added to the waste gases is in an amount in excess, for instance, by 20 percent of the amount stoichiometrically needed. Usually, the ammonia is applied in the form of gas, but it is also applied by means of a spray in the form of an aqueous solution in a similar amount, resulting in an equally high nitrogen oxide removing efficiency.

The catalyst or catalytic composition to be used in this invention is either activated charcoal or vanadium oxide supported on pieces of activated charcoal. As the vanadium oxides, $VO_2$, $V_2O_3$ and $V_2O_5$ of a stable form are suitable, and in the formulation of their catalytic composition, activated charcoal is used as the carrier. The procedure to apply the catalyst to the carrier is not limited and, for example, the well-known immersion method may be employed. When the catalyst component is used in a too small amount, the object of the invention may not be achieved. On the contrary, when an excess of the amount is used, no enhancement of the effects may be obtained. Accordingly, the suitable amount of the catalyst component should be from 0.5 to 30 percent, preferably from 1 to 10 percent, by weight of the weight of the activated charcoal as carrier.

Owing to its catalytic activities on a large surface area, the activated charcoal acts as the catalyst rather than as the adsorbent. It is used in the form of granules, produced by shaping or crushing, usually having a specific surface area of 800 – 1,500 m$^2$/g, an average diameter of pores of 10 – 30 A and a bulk density of 0.3 – 0.9 g/ml. It has been ascertained through a series of tests that such activated charcoal may be suitable for regeneration without difficulty, and a continuous operation can be performed for a long duration of time.

In the case where a vanadium trioxide is used, it is proposed to heat ammonium metavanadate itself or ammonium metavanadate supported on a carrier in a stream of hydrogen at a temperature of from 250° to 650°C, to produce the desired vanadium trioxide. The use of such vanadium trioxide is advantageous in simplifying the operation over the conventional method wherein ammonium metavanadate is heated at about 500°C for several hours and decomposed, to produce a powdery vanadium pentoxide and the vanadium pentoxide thus produced is heated and reduced at 500°C in a stream of hydrogen for about 15 hours, to finally obtain the desired vanadium trioxide.

In practicing the method of the present invention wherein it is required to pass the gaseous mixture of a nitrogen oxide-containing gas and ammonia through the tower having a contact mass consisting of activated charcoal or the catalytic composition at a space velocity of from 1,000 to 50,000 parts by volume (S.T.P.) of gaseous mixture per hour per part by volume of catalyst, if the space velocity is smaller than 1,000, an operation on an industrial scale would not be feasible, while if it is greater than 50,000, the rate of reaction would become too low to attain the objects of the invention.

It is a striking characteristic of this invention that the reaction may be carried out at a a low temperature, i.e. between room temperature and 150°C. As described above, the gas phase reaction between nitrogen oxides and ammonia takes place readily at about room temperature, and such reaction may be accelerated by the method of this invention. However, when the reaction temperature rises over 150°C, the reaction would become so rapid as to induce an extraordinary heating of the catalyst or catalytic composition, and to produce substances other than the desired harmless products, and still further to reduce the nitrogen oxide-removing efficiency. Therefore, the reaction temperature is required not to exceed 150°C.

Furthermore, the effect of the invention may be more enhanced by washing the waste gases with water or an alkaline solution before they are mixed with ammonia.

The collection of the particles produced can be efficiently carried out by applying the reacted mixture for one of the known dust collecting methods, such as water-washing and a cyclone system.

This invention will become more clarified by reference to the following description taken in conjunction with the accompanying drawing.

DESCRIPTION OF THE DRAWING

The single FIGURE is a schematic illustration of one embodiment of this invention.

In the drawing, a pre-washing tower 1 is provided with a pump 2 for circulating water or an alkaline solution. A waste gas is introduced through an inlet 3 by means of a suction blower 4. In the case that any reactive gases other than nitrogen oxides are included in the waste gas, most of these gases can be removed from the waste gas in the pre-washing tower. Then, the waste gas is passed into a tower 5 having a contacting mass 6, consisting the catalyst or catalytic composition. Meanwhile, ammonia gas is introduced through a pipe 7 and mixed with the waste gas prior to flow into the tower 5. The reaction between the nitrogen oxide and ammonia starts to take place when they have been mixed and is completed when they have been passed through the contact mass 6. The waste gas containing fine particles produced by the reaction is further passed into a dust collector 8. The waste gas thus purified is released into the air through an outlet 9.

The following examples further illustrate how the method of the invention may be carried out.

Example 1

In the process shown in the drawing, a waste gas containing 5,000 ppm of nitrogen oxides (NO + NO$_2$) was introduced through inlet 3 into tower 1 in which a 5 percent aqueous solution of caustic soda was circulated by operation of blower 4. The flow rate of the waste gas was 10 m$^3$/min. and the space velocity was 2,000 hr$^{-1}$. On the other hand, gaseous ammonia was introduced through pipe 7 at a flow rate of 50 l/min. The nitrogen oxides were made to react with the ammonia in contact mass 6, consisting of activated charcoal. Then, the gas containing fine particles produced by the reaction was passed to dust collector 8 to remove the fine particles. The concentration of the nitrogen oxides in the waste gas released through outlet 9 was observed to have been lowered to 300 ppm, the removal efficiency being 94.0 percent.

Example 2

In the process shown in the drawing, a waste gas containing 5,000 ppm of nitrogen oxides (NO + NO$_2$) was introduced through inlet 3 to tower 1 in which a 5 percent aqueous solution of caustic soda was circulated by the operation of blower 4. The flow rate of the waste gas was 10 m$^3$/min. and the space velocity was 3,450 hr$^{-1}$. On the other hand, ammonia gas was introduced through pipe 7 at a flow rate of 60 l/min. The nitrogen oxides were reacted with ammonia at 30°C in contact mass 6, consisting of a catalytic composition containing vanadium trioxide, 3.0 percent by weight of the carrier, carried on activated charcoal. After having been passed through dust collector 8 to be scrubbed with water, the treated waste gas had a concentration of 50 ppm in terms of nitrogen oxides at the point of outlet 9, the removal efficiency being 99.0 percent.

For comparison, similar procedures were repeated except that a catalytic composition containing vanadium trioxide, 3.0 percent by weight of the carrier, carried on alumina was used in place of the vanadium trioxide carried on activated charcoal. The concentration of nitrogen oxides at the outlet was found to be 1,000 ppm, the removal efficiency being 80 percent.

Furthermore, the same procedures were repeated except that a catalytic composition containing vanadium trioxide, 3.0 percent by weight of the carrier, carried on pumice was employed. The resulting concentration of nitrogen oxides at the outlet was 2,000 ppm, the removal efficiency being 60 percent.

Example 3

The procedures of Example 2 were repeated except that a catalytic composition containing vanadium pentoxide (V$_2$O$_5$) in an amount of 3.0 percent by weight of the carrier, carried on activated charcoal was employed under a space velocity of 3,430 hr$^{-1}$, at the reaction temperature of 35°C. The resulting concentration of nitrogen oxides at the outlet was found to be 200 ppm, the removal efficiency being 96 percent.

Example 4

A waste gas containing 2,000 ppm of nitrogen oxides (NO + NO$_2$) at 100°C was introduced directly into tower 5, without passing it through the pre-washing tower 1, at a flow rate of 25 m$^3$/min. by the operation of fan 4. The space velocity employed was 3,080 hr$^{-1}$. On the other hand, gaseous ammonia was introduced through pipe 7 at a flow rate of 60 l/min. The nitrogen oxides were made to react with the ammonia in contact mass 6, consisting of a catalytic composition containing vanadium trioxide, 3.0 percent by weight of the carrier, carried on activated charcoal. After having been passed through the dust collector 8 and scrubbed with water, the resulting concentration of nitrogen oxides ($NO + NO_2$) at the outlet was found to be 100 ppm, the removal efficiency being 95 percent.

The vanadium trioxide employed in Examples 2 and 4 was prepared by the following procedure.

Ten grams of ammonium metavanadate were put into a reaction tube of fused silica. It was heated in an electric furnace in a stream of hydrogen flowing at a rate of 0.2 l/min. at 500°C for 15 hours, to produce 6.1 g of black powder. The product was then tested by the X-ray diffractiometry to find that it was a vanadium trioxide. Further, according to the chemical analysis, its composition was confirmed to correspond to $VO_{1.505}$.

What is claimed is:

1. A method for removing nitrogen oxide from waste gases which comprises:
   a. washing the waste gas with water or alkaline solution;
   b. adding ammonia to the washed waste gas;
   c. passing the ammonia-washed waste gas mixture in contact with a catalyst selected from the group consisting of activated charcoal and vanadium trioxide supported on activated charcoal at a temperature between room temperature and 150°C with a space velocity of from 1,000 to 50,000 parts by volume at standard temperature and pressure of the gas mixture per hour per part by volume of the catalyst; and
   d. subjecting the thus-treated gaseous mixture to a dust collection treatment.

2. The method according to claim 1 in which said vanadium trioxide is produced by decomposing and reducing ammonium metavanadate at a temperature of from 250° to 650°C in a stream of hydrogen.

3. The method according to claim 1 in which said activated charcoal has a specific surface area of from 800 to 1,500 m²/g, an average diameter of pores of from 10 to 30 A and a bulk density of from 0.3 to 0.9 g/ml.

4. The method according to claim 1 in which the amount of said ammonia added to said waste gas is 20 percent in excess of the stoichiometrically nitrogen oxide equivalent.

5. The method according to claim 1 in which the amount of said vanadium oxide supported on said activated charcoal is from 0.5 to 30 percent by weight based on the weight of activated charcoal.

* * * * *